(12) United States Patent
Cernohous et al.

(10) Patent No.: US 10,370,510 B2
(45) Date of Patent: Aug. 6, 2019

(54) CONSUMABLE FILAMENTS HAVING REVERSIBLE REINFORCEMENT FOR EXTRUSION-BASED ADDITIVE MANUFACTURING

(71) Applicant: Stratasys, Inc., Eden Prairie, MN (US)

(72) Inventors: Jeffrey Jacob Cernohous, Hudson, WI (US); Adam R. Pawloski, Lake Elmo, MN (US); Benjamin A. Demuth, River Falls, MN (US)

(73) Assignee: STRATASYS, INC., Eden Prairie, MN (US)

( * ) Notice: Subject to any disclaimer, the term of this patent is extended or adjusted under 35 U.S.C. 154(b) by 519 days.

(21) Appl. No.: 15/028,224

(22) PCT Filed: Oct. 2, 2014

(86) PCT No.: PCT/US2014/058791
§ 371 (c)(1),
(2) Date: Apr. 8, 2016

(87) PCT Pub. No.: WO2015/054021
PCT Pub. Date: Apr. 16, 2015

(65) Prior Publication Data
US 2016/0251486 A1 Sep. 1, 2016

Related U.S. Application Data

(60) Provisional application No. 61/888,185, filed on Oct. 8, 2013.

(51) Int. Cl.
*B29C 67/00* (2017.01)
*C08J 5/04* (2006.01)
(Continued)

(52) U.S. Cl.
CPC ............. *C08J 5/046* (2013.01); *B29C 48/022* (2019.02); *B29C 64/106* (2017.08); *C08J 5/044* (2013.01);
(Continued)

(58) Field of Classification Search
CPC ..... B29C 64/106; B29C 64/118; B33Y 70/00; B33Y 10/00
See application file for complete search history.

(56) References Cited

U.S. PATENT DOCUMENTS 5,121,329 A 6/1992 Crump
5,503,785 A * 4/1996 Crump .................. B33Y 10/00
264/308
(Continued)

OTHER PUBLICATIONS

International Search Report and Written Opinion dated Dec. 23, 2014 for corresponding International Application No. PCT/US2014/058791, filed Oct. 2, 2014.

*Primary Examiner* — Nahida Sultana
(74) *Attorney, Agent, or Firm* — Westman, Champlin & Koehler, P.A.

(57) ABSTRACT

A consumable assembly for use with an additive manufacturing system to print three-dimensional parts, the consumable assembly including a supply device (e.g., a spool) and a filament supported by the supply device, where the filament has a composition comprising one or more elastomers and one or more reinforcing additives, and a filament geometry configured to be received by a liquefier assembly of the additive manufacturing system. The composition is preferably configured to be thermally and/or chemically modified to reduce its flexural modulus.

9 Claims, 10 Drawing Sheets

(51) Int. Cl.
  *B29C 48/00*      (2019.01)
  *B29C 64/106*     (2017.01)
  *B33Y 10/00*          (2015.01)
  *B33Y 70/00*          (2015.01)
  *B29K 23/00*          (2006.01)
  *B29K 25/00*          (2006.01)
  *B29K 33/04*          (2006.01)
  *B29K 75/00*          (2006.01)
  *B29L 9/00*           (2006.01)

(52) U.S. Cl.
  CPC ...... *B29K 2023/00* (2013.01); *B29K 2025/04* (2013.01); *B29K 2033/04* (2013.01); *B29K 2075/00* (2013.01); *B29K 2995/0082* (2013.01); *B29L 2009/00* (2013.01); *B33Y 10/00* (2014.12); *B33Y 70/00* (2014.12); *C08J 2323/08* (2013.01); *C08J 2423/12* (2013.01); *C08J 2429/04* (2013.01); *C08J 2467/04* (2013.01); *C08J 2477/06* (2013.01)

(56) References Cited

U.S. PATENT DOCUMENTS

| | | | | |
|---|---|---|---|---|
| 6,004,124 | A | 12/1999 | Swanson et al. | |
| 6,228,923 | B1 * | 5/2001 | Lombardi | C08L 53/00 524/425 |
| 6,322,728 | B1 * | 11/2001 | Brodkin | A61C 13/0003 264/113 |
| 6,547,994 | B1 * | 4/2003 | Monkhouse | B29C 64/165 264/113 |
| 6,722,872 | B1 | 4/2004 | Swanson et al. | |
| 6,923,634 | B2 | 8/2005 | Swanson et al. | |
| 7,122,246 | B2 | 10/2006 | Comb et al. | |
| 7,127,309 | B2 | 10/2006 | Dunn et al. | |
| 7,374,712 | B2 | 5/2008 | Swanson et al. | |
| 7,384,255 | B2 | 6/2008 | LaBossiere et al. | |
| 7,604,470 | B2 | 10/2009 | LaBossiere et al. | |
| 7,625,200 | B2 | 12/2009 | Leavitt | |
| 7,896,209 | B2 | 3/2011 | Batchelder et al. | |
| 7,938,351 | B2 | 5/2011 | Taatjes et al. | |
| 7,938,356 | B2 | 5/2011 | Taatjes et al. | |
| 8,153,182 | B2 | 4/2012 | Comb et al. | |
| 8,221,669 | B2 | 7/2012 | Batchelder et al. | |
| 8,236,227 | B2 | 8/2012 | Batchelder et al. | |
| 8,404,171 | B2 * | 3/2013 | Heenan | B29C 64/106 264/308 |
| 8,439,665 | B2 | 5/2013 | Batchelder et al. | |
| 8,944,802 | B2 * | 2/2015 | Patterson | B29C 64/106 425/375 |
| 2003/0004600 | A1 | 1/2003 | Priedeman, Jr. | |
| 2004/0222561 | A1 | 11/2004 | Hopkins | |
| 2006/0047052 | A1 * | 3/2006 | Barrera | B82Y 30/00 524/495 |
| 2011/0074065 | A1 | 3/2011 | Batchelder et al. | |
| 2011/0233804 | A1 | 9/2011 | Batchelder et al. | |
| 2012/0070523 | A1 | 3/2012 | Swanson et al. | |
| 2012/0164256 | A1 | 6/2012 | Swanson et al. | |
| 2013/0078073 | A1 | 3/2013 | Comb et al. | |
| 2013/0161442 | A1 | 6/2013 | Mannella et al. | |
| 2014/0158802 | A1 | 6/2014 | Batchelder et al. | |
| 2015/0084222 | A1 * | 3/2015 | Heston | B29C 48/92 264/40.7 |
| 2015/0266235 | A1 * | 9/2015 | Page | B22F 3/1055 264/245 |

\* cited by examiner

CONSUMABLE FILAMENTS HAVING REVERSIBLE REINFORCEMENT FOR EXTRUSION-BASED ADDITIVE MANUFACTURING

BACKGROUND

The present disclosure relates to consumable materials for use in additive manufacturing systems for printing or otherwise producing three-dimensional (3D) parts and support structures. In particular, the present disclosure relates to consumable filaments of part materials for use in extrusion-based additive manufacturing systems to print 3D parts using an additive manufacturing technique.

Additive manufacturing systems are used to print or otherwise build 3D parts from digital representations of the 3D parts (e.g., STL format files) using one or more additive manufacturing techniques. Examples of commercially available additive manufacturing techniques include extrusion-based techniques, jetting, selective laser sintering, powder/binder jetting, electron-beam melting, digital light processing (DLP), and stereolithographic processes. For each of these techniques, the digital representation of the 3D part is initially sliced into multiple horizontal layers. For each sliced layer, a tool path is then generated, which provides instructions for the particular additive manufacturing system to print the given layer.

For example, in an extrusion-based additive manufacturing system, a 3D part may be printed from a digital representation of the 3D part in a layer-by-layer manner by extruding a flowable part material. The part material is extruded through an extrusion tip carried by a print head of the system, and is deposited as a sequence of roads on a platen in planar layers. The extruded part material fuses to previously deposited part material, and solidifies upon a drop in temperature. The position of the print head relative to the substrate is then incremented, and the process is repeated to form a 3D part resembling the digital representation.

In fabricating 3D parts by depositing layers of a part material, supporting layers or structures are typically built underneath overhanging portions or in cavities of 3D parts under construction, which are not supported by the part material itself. A support structure may be built utilizing the same deposition techniques by which the part material is deposited. The host computer generates additional geometry acting as a support structure for the overhanging or free-space segments of the 3D part being formed. Support material is then deposited pursuant to the generated geometry during the printing process. The support material adheres to the part material during fabrication, and is removable from the completed 3D part when the printing process is complete.

SUMMARY

An aspect of the present disclosure is directed to a consumable assembly for use with an additive manufacturing system to print 3D parts. The consumable assembly includes a supply device (e.g., a spool and/or container) and a filament supported by the supply device. The filament has a composition that includes one or more elastomers and one or more reinforcing additives, and where the filament has a filament geometry configured to be received by a liquefier assembly of the additive manufacturing system. The composition is preferably configured to be thermally and/or chemically modified to reduce its flexural modulus.

Another aspect of the present disclosure is directed to a method for printing a 3D part with an additive manufacturing system. The method includes feeding a consumable filament to a liquefier assembly retained by the additive manufacturing system, where the consumable filament has a composition that comprises one or more elastomers and one or more reinforcing additives, and has a flexural modulus (e.g., greater than about 300 megaPascals). The method also includes melting the fed consumable filament in the liquefier assembly, extruding the melt from a nozzle of the liquefier assembly using, at least in part, a viscosity-pump action from the fed consumable filament, and depositing the extruded melt as a series of roads to print the 3D part in a layer-by-layer manner. The method further includes modifying the composition of the printed 3D part to reduce the flexural modulus of the composition. The modification may occur during printing of the 3D part and/or subsequently thereafter.

Another aspect of the present disclosure is directed to a method for manufacturing a filament for use with an additive manufacturing system. The method includes blending and/or melt processing a composition that includes one or more elastomers and one or more reinforcing additives, and forming the composition into a filament geometry configured to be received by a liquefier assembly of the additive manufacturing system. The composition is preferably configured to be thermally and/or chemically modified to reduce its flexural modulus.

DEFINITIONS

Unless otherwise specified, the following terms as used herein have the meanings provided below:

The term "additive manufacturing system" refers to a system that prints, builds, or otherwise produces 3D parts and/or support structures at least in part using an additive manufacturing technique. The additive manufacturing system may be a stand-alone unit, a sub-unit of a larger system or production line, and/or may include other non-additive manufacturing features, such as subtractive-manufacturing features, pick-and-place features, two-dimensional printing features, and the like.

The terms "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the present disclosure.

The term "polymer" refers to a polymerized molecule having one or more monomer specifies, and includes homopolymers and copolymers. The term "copolymer" refers to a polymer having two or more monomer species, and includes terpolymers (i.e., copolymers having three monomer species).

Reference to "a" chemical compound refers one or more molecules of the chemical compound, rather than being limited to a single molecule of the chemical compound. Furthermore, the one or more molecules may or may not be identical, so long as they fall under the category of the chemical compound. Thus, for example, "a" polyamide is interpreted to include one or more polymer molecules of the polyamide, where the polymer molecules may or may not be identical (e.g., different molecular weights and/or isomers).

The term "providing", such as for "providing a material", when recited in the claims, is not intended to require any particular delivery or receipt of the provided item. Rather, the term "providing" is merely used to recite items that will be referred to in subsequent elements of the claim(s), for purposes of clarity and ease of readability.

Unless otherwise specified, temperatures referred to herein are based on atmospheric pressure (i.e. one atmosphere).

The terms "at least one" and "one or more of" an element are used interchangeably, and have the same meaning that includes a single element and a plurality of the elements, and may also be represented by the suffix "(s)" at the end of the element.

The terms "about" and "substantially" are used herein with respect to measurable values and ranges due to expected variations known to those skilled in the art (e.g., limitations and variabilities in measurements).

DETAILED DESCRIPTION

The present disclosure is directed to consumable filaments for use in extrusion-based additive manufacturing systems, such as fused deposition modeling systems, where the consumable filaments are produced using one or more elastomers and one or more fillers. As discussed below, the filler(s) preferably reinforce the elastomer(s) during a printing process and may be subsequently altered, by chemical and/or thermal exposure, to modify the elastomer(s) and achieve desired end product characteristics.

Figure 1:
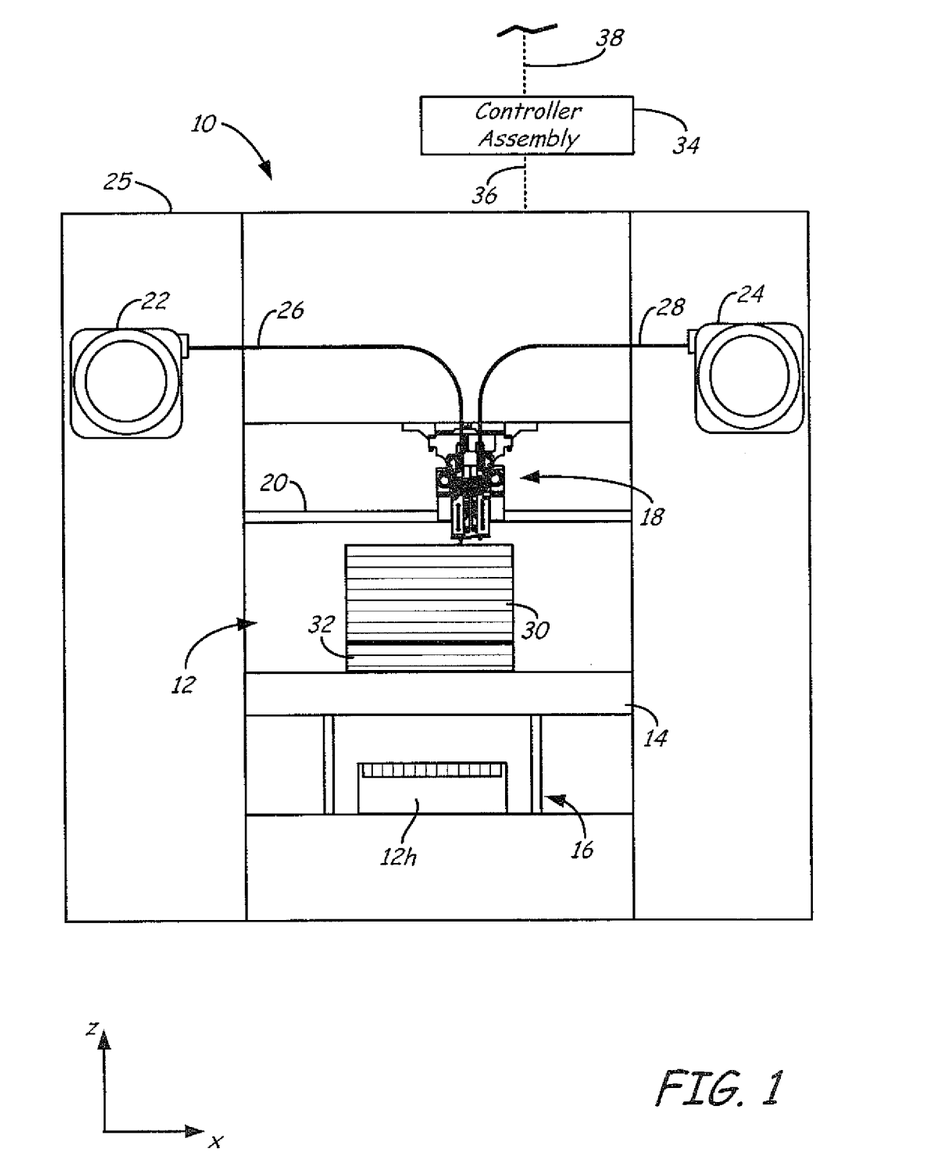
FIG. 1 is a front view of an additive manufacturing system configured to print 3D parts from a part material of the present disclosure.

The consumable filament materials may be used with any suitable additive manufacturing system. For instance, system 10 is an example additive manufacturing system for printing 3D parts or models and corresponding support structures using a layer-based, additive manufacturing technique. Suitable additive manufacturing systems for system 10 include extrusion-based systems developed by Stratasys, Inc., Eden Prairie, Minn., such as fused deposition modeling systems under the trademark "FDM".

In the shown embodiment, system 10 includes chamber 12, platen 14, platen gantry 16, print head 18, head gantry 20, consumable assemblies 22 and 24. System 10 may also include a system casing 25, which is a structural component of system 10 and may include multiple structural subcomponents such as support frames, housing walls, and the like. In some embodiments, system casing 25 may include container bays or other receiving areas configured to receive container portions or spools of consumable assemblies 22 and 24. In alternative embodiments, the container bays may be omitted to reduce the overall footprint of system 10. In these embodiments, the container portions or spools of consumable assemblies 22 and 24 may stand adjacent to system casing 25.

Chamber 12 is an example build environment that contains platen 14 for printing 3D parts and support structures, where chamber 12 may be may be optionally omitted and/or replaced with different types of build environments. For example, 3D parts and support structures may be built in a build environment that is open to ambient conditions or may be enclosed with alternative structures (e.g., flexible curtains).

In the shown example, the interior volume of chamber 12 may be heated with heater 12h to reduce the rate at which the part and support materials solidify after being extruded and deposited (e.g., to reduce distortions and curling). Heater 12h may be any suitable device or assembly for heating the interior volume of chamber 12, such as by radiant heating and/or by circulating heated air or other gas (e.g., inert gases). In alternative embodiments, heater 12h may be replaced with other conditioning devices, such as a cooling unit to generate and circulate cooling air or other gas. The particular thermal conditions for the build environment may vary depending on the particular consumable materials used.

Platen 14 is a platform on which 3D parts and support structures are printed in a layer-by-layer manner, and is supported by platen gantry 16. In some embodiments, platen 14 may engage and support a build substrate, which may be a tray substrate as disclosed in Dunn et al., U.S. Pat. No. 7,127,309; may be fabricated from plastic, corrugated cardboard, or other suitable material; and may also include a flexible polymeric film or liner, painter's tape, polyimide tape, adhesive laminate (e.g., an applied glue), or other disposable fabrication for adhering deposited material onto the platen 14 or onto the build substrate. In some embodiments, platen 14 and/or the build substrate may be heated, such as with one or more electrically-resistive heating elements.

Platen gantry 16 is a gantry assembly configured to move platen 14 along (or substantially along) the vertical z-axis. Platen gantry 16 may operate with one or more motors (e.g., stepper motors and encoded DC motors), gears, pulleys, belts, screws, robotic arms, and the like.

In the shown example, print head 18 is a dual-tip extrusion head configured to receive consumable filaments from consumable assemblies 22 and 24 (e.g., via guide tubes 26 and 28) for printing 3D part 30 and support structure 32 on platen 14. Consumable assembly 22 may contain a supply of the consumable filament of the present disclosure material for printing 3D part 30 from the part material of the consumable filament. Consumable assembly 24 may contain a supply of a support material (e.g., a support material filament) for printing support structure 32 from the given support material.

Consumable assemblies 22 and 24 each preferably include a container portion that is an easily loadable, removable, and replaceable container device that retains a supply of a consumable filament for printing with system 10. Consumable assemblies 22 and 24 may retain the consumable filament on a wound spool, a spool-less coil, or other supply arrangement, such as discussed in Swanson et al., U.S. Pat. No. 7,374,712; Taatjes at al., U.S. Pat. No. 7,938,356; Mannella et al., U.S. Publication Nos. 2013/0161432 and 2013/0161442; and Batchelder et al., U.S. Publication No. 2014/0158802. The consumable filament supply may be partially or fully contained (e.g., enclosed in a container and/or liner) or exposed to external conditions (e.g., wound on a spool, but otherwise exposed).

In the shown embodiment, head gantry 20 is a robotic mechanism configured to move print head 18 (optionally, with the use of one or more head carriages) in (or substantially in) a horizontal x-y plane above platen 14. Examples of suitable gantry assemblies for head gantry 20 include those disclosed in Swanson et al., U.S. Pat. No. 6,722,872; and Comb et al., U.S. Publication No. 2013/0078073, where head gantry 20 may also support deformable baffles (not shown) that define a ceiling for chamber 12. While illustrated as a bridge-type gantry, head gantry 20 may utilize any suitable robotic mechanism for moving print head 18, such as with one or more motors (e.g., stepper motors and encoded DC motors), gears, pulleys, belts, screws, robotic arms, and the like.

In a further alternative embodiment, platen 14 may be configured to move in the horizontal x-y plane within chamber 12, and print head 18 may be configured to move along the z-axis. Other similar arrangements may also be used such that one or both of platen 14 and print head 18 are moveable relative to each other. Platen 14 and print head 18 may also be oriented along different axes. For example, platen 14 may be oriented vertically and print head 18 may print 3D part 30 and support structure 32 along the x-axis or the y-axis. In another example, platen 14 and/or print head 18 may be moved relative to each other in a non-Cartesian coordinate system, such as in a polar coordinate system.

System 10 also includes controller assembly 34, which is one or more computer-based systems configured to operate the components of system 10. Controller assembly 34 may communicate over communication line 36 with the various components of system 10, such as print head 18, chamber 12 (e.g., heater 12h), motors for platen gantry 16 and head gantry 20, and various sensors, calibration devices, display devices, and/or user input devices. In some embodiments, controller assembly 34 may also communicate with one or more of platen 14, platen gantry 16, head gantry 20, and any other suitable component of system 10.

Additionally, controller assembly 34 may also communicate over communication line 38 with external devices, such as other computers and servers over a network connection (e.g., an internet connection, a local area network (LAN) connection, a universal serial bus (USB) connection, a cellular connection, and the like). While communication lines 36 and 38 are each illustrated as a single signal line, they may each include one or more electrical, optical, and/or wireless signal lines and intermediate control circuits, where portions of communication line(s) 36 may also be subcomponents of print head 18.

In some embodiments, the one or more computer-based systems of controller assembly 34 are internal to system 10, allowing a user to operate system 10 over a network communication line 38, such as from an external computer in the same or similar manner as a two-dimensional printer. Alternatively, controller assembly 34 may also include one or more external computer-based systems (e.g., desktop, laptop, server-based, cloud-based, tablet, mobile media device, and the like) that may communicate with the internal computer-based system(s) of controller assembly 34, as well as communicating over a network via communication line 38.

In this alternative embodiment, the processing functions of controller assembly 34 discussed below may be divided between the internal and external computer-based systems. In yet another alternative embodiment, the computer-based system(s) of controller assembly 34 may all be located external to system 10 (e.g., one or more external computers), and may communicate with system 10 over communication line 36.

Figure 2:
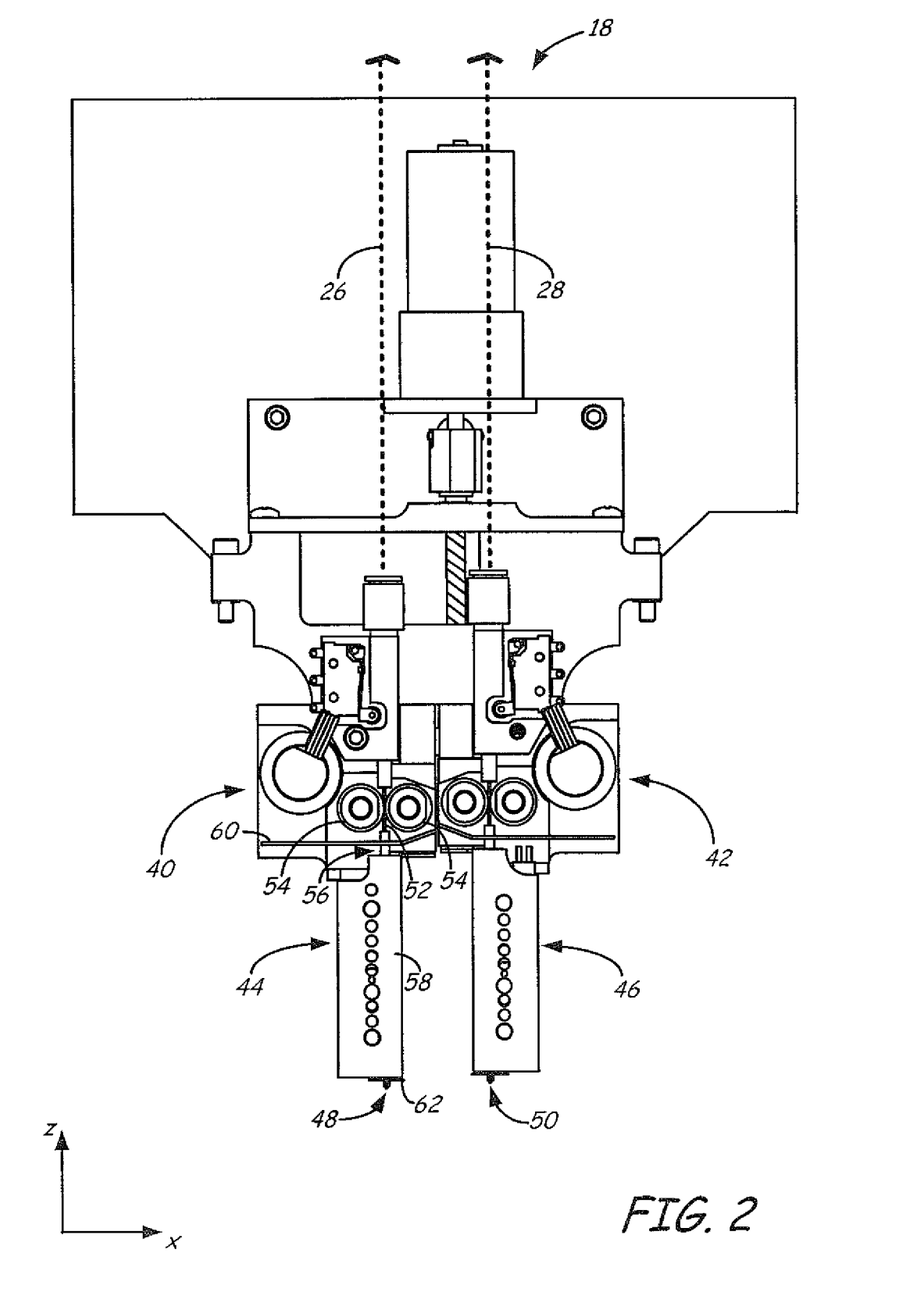
FIG. 2 is a front view of a print head of the additive manufacturing system.

FIG. 2 illustrates a suitable device for print head 18, as described in Leavitt, U.S. Pat. No. 7,625,200. Additional examples of suitable devices for print head 18, and the connections between print head 18 and head gantry 20 include those disclosed in Crump et al., U.S. Pat. No. 5,503,785; Swanson et al., U.S. Pat. No. 6,004,124; LaBossiere, et al., U.S. Pat. Nos. 7,384,255 and 7,604,470; Batchelder et al., U.S. Pat. No. 7,896,209; and Comb et al., U.S. Pat. No. 8,153,182. In additional embodiments, in which print head 18 is an interchangeable, single-nozzle print head, examples of suitable devices for each print head 18, and the connections between print head 18 and head gantry 20 include those disclosed in Swanson et al., U.S. Patent Application Publication No. 2012/0164256.

Figure 3:
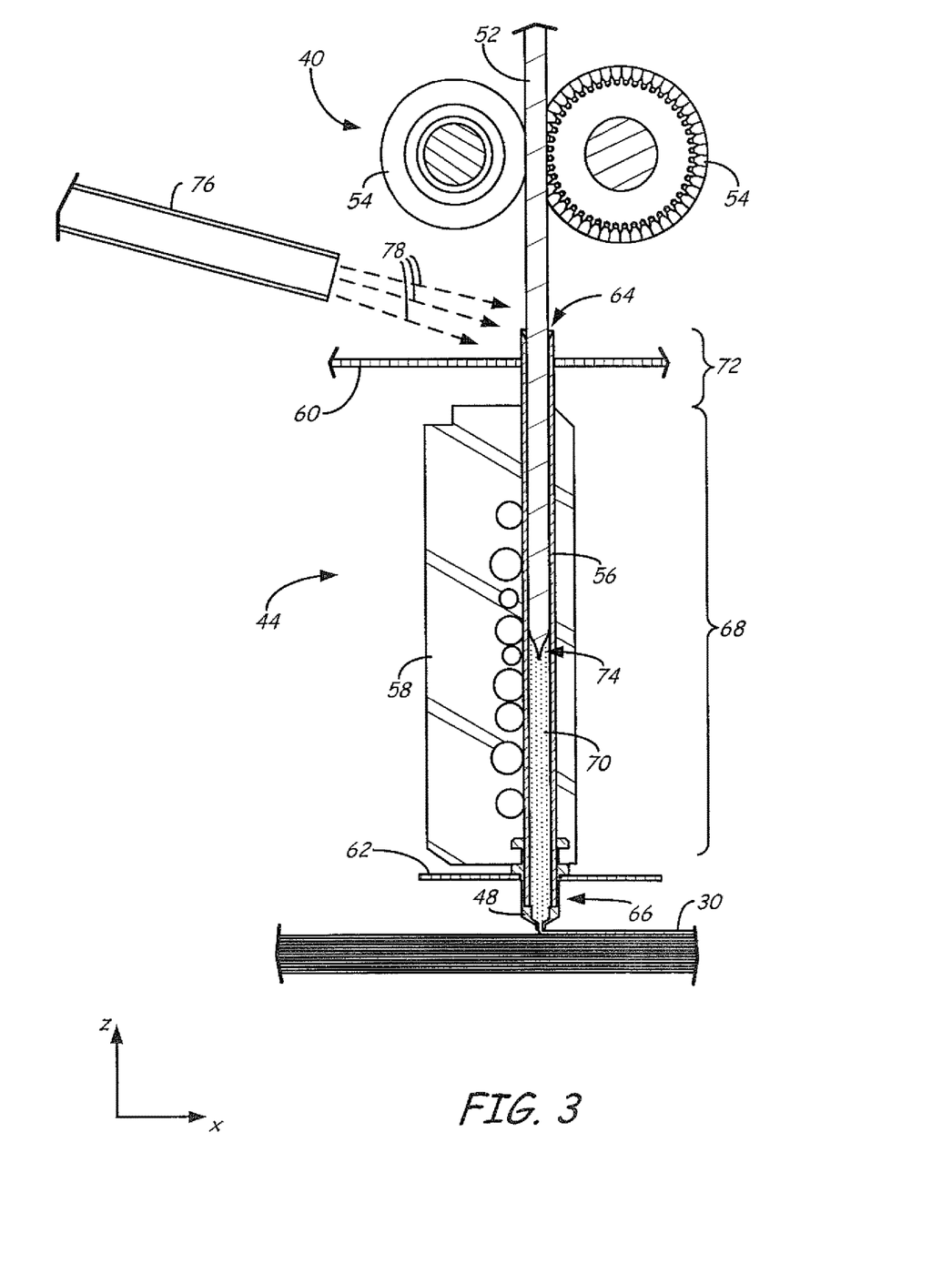
FIG. 3 is an expanded sectional view of a drive mechanism, a liquefier assembly, and a nozzle of the print head.

In the shown dual-tip embodiment, print head 18 includes two drive mechanism 40 and 42, two liquefier assemblies 44 and 46, and two nozzles 48 and 50. In this embodiment the part material and the support material each preferably have a filament geometry for use with print head 18. For example, as best shown in FIG. 3, the part material may be provided as filament 52.

During operation, controller assembly 34 may direct wheels 54 of drive mechanism 40 to selectively draw successive segments filament 52 from consumable assembly 22 (via guide tube 26), and feed filament 52 to liquefier assembly 44. Liquefier assembly 44 may include liquefier tube 56, thermal block 58, heat shield 60, and tip shield 62, where liquefier tube 56 includes inlet end 64 for receiving the fed filament 52. Nozzle 48 and tip shield 62 are accordingly secured to outlet end 66 of liquefier tube 56, and liquefier tube 56 extends through thermal block 58 and heat shield 60.

While liquefier assembly 44 is in its active state, thermal block 58 heats liquefier tube 56 to define heating zone 68. The heating of liquefier tube 56 at heating zone 68 melts the part material of filament 52 in liquefier tube 56 to form melt 70. The upper region of liquefier tube 56 above heating zone 68, referred to as transition zone 72, is not directly heated by thermal block 58. This generates a thermal gradient or profile along the longitudinal length of liquefier tube 56.

The molten portion of the part material (i.e., melt 70) forms meniscus 74 around the unmelted portion of filament 52. During an extrusion of melt 70 through nozzle 48, the downward movement of filament 52 functions as a viscosity pump to extrude the part material of melt 70 out of nozzle 48 as extruded roads to print 3D part 30 in a layer-by-layer manner. While thermal block 58 heats liquefier tube 56 at heating zone 68, cooling air may also be blown through a manifold 76 toward inlet end 64 of liquefier tube 56, as depicted by arrows 78. Heat shield 60 assists in directing the air flow toward inlet end 64. The cooling air reduces the temperature of liquefier tube 56 at inlet end 64, which prevents filament 52 from softening or melting at transition zone 72.

As can be appreciated, printing 3D parts (e.g., 3D part 30) from elastomers can be difficult to achieve due to the inherent characteristics of elastomers that create problems in the delivery and melt processing of the elastomer, in filament form, in an extrusion-based additive manufacturing system, such as system 10. Elastomeric materials are typically flexible and soft. The flexibility and compressive nature of elastomers are limitations in that they inhibit the ability to push filaments of material through nozzle 48. For example, the flexural modulus of elastomers are typically less than about 100 megaPascals (MPa). In comparison, print head 18 can require a flexural modulus greater than about 500 MPa to effectively extrude the part material of filament 52 with the viscosity-pump action. As used herein, the flexural modulus may be measured by dynamic mechanical analysis (DMA) in a three point bending configuration, such as under ASTM D790-10.

In particular, the downward movement of filament 52 functions as a viscosity pump to extrude the molten material 70 as an extrudate. However, there is a time response delay between when controller assembly 34 commands the drive mechanism 40 to change the feed rate of filament 52 to liquefier assembly 44, and when the extrudate flow rate from nozzle 48 actually changes. This time response delay can be exasperated by the lower flexure modulus of an elastomer material due to its lower flexural modulus, which can result in lower printing accuracies and part quality.

Accordingly, the present disclosure is directed at stiffening the elastomer(s) in filament form to enable useful filaments (e.g., filament 52) or other feedstocks for extrusion-based additive manufacturing applications. The stiffening or reinforcing additive that is incorporated may be thermally modified, chemically modified, or both, to ultimately change the physical characteristics of the filament material to specific desired elastomeric characteristics of the printed 3D part 30. The modification may occur during formation of 3D part 30 or subsequently thereafter.

The elastomer(s) having an average flexural modulus below 100 MPa may be reinforced by melt processing the elastomer(s) with one or more reinforcing additives. By incorporation of at least one reinforcing additive to produce a compound, the flexural modulus of the compound can be increased substantially above 100 MPa. In other words, the flexural modulus of the part material for filament 52 can be increased above that of the elastomer(s) itself by mechanisms of physical reinforcement. By subsequent processing of the part material, the reinforcement nature of the additives may be diminished or otherwise reversed. As embodied by this disclosure, the reinforcement effects of the reinforcing additive can be diminished in subsequent processing by thermal and/or chemical techniques.

In certain embodiments, example elastomers may include a variety of elastomeric thermoplastic materials derived from polyolefins, polyesters, styrenics, polyurethanes, and combinations thereof. Examples of polyolefin elastomers include ethylene-octene copolymers (e.g., polymers from Dow Chemical Company, Midland, Mich. under the trademark "ENGAGE"), olefin block copolymers (e.g., polymers from Dow Chemical Company, Midland, Mich. under the trademark "INFUSE"), polypropylene-based elastomers (e.g., polymers from Exxon Mobil Chemical, Houston, Tex. under the trademark "VISTAMAXX"), and combinations thereof.

Example polyester thermoplastic elastomers include those from DuPont, Wilmington, Del. under the trademark "HYTEL", and those from DSM, Heerlen, Netherlands under the trademark "AMITEL". Example elastomers based on styrenic polymers include those Dynasol Inc., Canton, Mass. under the trademark "CALPRENE", and various polymer classes offered by Kraton Polymers, Houston, Tex. under the trademark "KRATON". Example thermoplastic polyurethane elastomers include polymers from BASF Corporation, Florham Park, N.J. under the trademark "ELASTOLLAN", and from Lubrizol Advanced Materials, Wickliffe, Ohio under the trademark "ESTANE".

In one embodiment, the reinforcing additive is a fiber comprised of a thermoplastic polymer. Thermoplastics such as polypropylene, polylactic acid, and polyamide-6 exhibit greater modulus than the elastomer and can be produced into fibers.

The flexural modulus of thermoplastic fibers produced from polypropylene, polylactic acid, and polyamide-6 are about 1500 MPa, 3800 MPa, and 2300 MPa, respectively. More generally, many types of thermoplastics can be used such that the modulus of the compound produced with the elastomer is greater than the elastomer itself.

The thermoplastic fibers can be chopped or otherwise processed into short lengths in the range from about 0.25 millimeters to about 10 millimeters, and mixed with the elastomer by melt processing at temperatures lower than the softening temperature of the additive fibers. Fibers can be compounded with the elastomer(s) to increase the flexural modulus of the resulting part material.

The components of the part material may be blended and subjected to melt processing in order to produce the desired feedstock. The feedstock can be pelletized and then subsequently formed into a filament (e.g., filament 52) suitable for use in system 10. In some embodiments, the filament 52 has a flexural modulus of greater than about 300 MPa, greater than about 400 MPa, and/or greater than about 500 MPa.

The compounds may be processed into filament (e.g., filament 52) suitable for printing on system 10 at temperatures lower than the softening temperature of the additive fibers. Filaments produced in this manner exhibit stiffness greater than the elastomer, and are suitable for subsequent printing with system 10 (e.g., from print head 18).

Certain reinforcing additives may be thermally modified to reverse the effect on physical characteristics such as flexural modulus. In some embodiments, high temperature processing may be used to convert the elastomer compound to a more flexible form. By processing the fiber-reinforced elastomer at one or more temperatures greater than the softening temperature of the fiber, the fiber can be melted. Melting of the fiber can reduce the effect of fiber reinforcement, and thereby reduces the flexural modulus of the part material. In some preferred embodiments, the high temperature processing operation is performed within system 10 (e.g., within chamber 12 and/or print head 18). In this embodiment, nozzle 48 may be operated at a temperature above the softening temperature of the fiber additive. The resulting 3D part 30 produced by the printing may thereby exhibit a lower flexural modulus than the filament 52 used in its production.

In another embodiment, the reinforcing additive may be a mineral or a polymer with a flexural modulus that is greater than that of the elastomer. The reinforcing additive can be melt processed with the elastomer to produce a compound of higher modulus than elastomer itself, as discussed above. In this embodiment, example reinforcing additives include mineral whiskers (magnesium oxysulfates from Miliken Chemical under the tradename "HYPERFORM HPR 803i", mineral salts, and/or soluble polymers that reinforce the elastomer to increase its flexural modulus.

The reinforcing additives can be blended with the elastomer(s) by melt processing to produce compounds. Elastomer compounds containing these additives can achieve a flexural modulus greater than about 1500 MPa, for example, and can be processed into filament 52. As printed, the printed 3D part 30 retains a modulus greater than the elastomer. However, by chemically processing the printed 3D part 30, the reinforcing additive may be dissolved, fractured, softened, or otherwise degraded so that it no longer reinforces the elastomer(s), and the flexural modulus of the part material decreases.

In one embodiment, the additive is a water soluble polymer. By dissolution in water, the water soluble polymer is removed. In another embodiment, the additive is a mineral whisker. By chemically processing the part material in strong acid, the mineral whisker is partially dissolved and weakened. The part material after the chemical processing operation exhibits a modulus less than that of the initial part material (e.g., as filament 52). In some cases, the resulting 3D part 30 may have a porous structure after the chemical removal of some or all reinforcing additives comprising minerals and soluble polymers.

After the thermal and/or chemical modification, the resulting 3D part 30 preferably has a reduced flexural modulus (compared to that of filament 52) and such that 3D part 30 exhibits elastomeric properties. For example, the flexural modulus of the modified 3D part 30 may be about 100 MPa less than that of filament 52, about 200 MPa less than that of filament 52, about 300 MPa less than that of filament 52, and/or about 400 MPa less than that of filament 52. In some embodiments, the resulting 3D part 30 has a flexural modulus less than about 300 MPa, less than about 200 MPa, and/or less than about 150 MPa, and in some cases, less than about 100 MPa.

Additions of reinforcing additives such as minerals can be as much as 50% by weight in an elastomer, where the elastomer(s) may constitute the remaining portion of the part material. Additions of soluble polymer can be as much as 20% by weight, where the elastomer(s) may constitute the remaining portion of the part material.

The elastomer(s) and the at least one reinforcing additive are subjected to melt processing to form a feedstock used to form a filament suitable for extrusion-based additive manufacturing applications. The melt processing of the feedstock can be performed in a twin screw extruder. In certain embodiments, the processing is performed in co-rotating, segmented twin screw extruder. In such instances, the length: diameter of the twin screw extruder is at least 32:1. In another embodiment, the length:diameter of the twin screw extruder is at least 40:1. Those who are skilled in the art will recognize preferred screw designs and temperature profiles to achieve optimal blending of the elastomer and reinforcing additives of this invention.

In some embodiments, controller assembly 34 may servo or swap liquefier assemblies 44 and 46 between opposing active and stand-by states. For example, while liquefier assembly 46 is servoed to its active state for extruding the support material to print a layer of support structure 32, liquefier assembly 44 is switched to a stand-by state to prevent the part material from being extruded while liquefier assembly 46 is being used. After a given layer of the support material is completed, controller assembly 34 then servoes liquefier assembly 46 to its stand-by state, and switches liquefier assembly 44 to its active state for extruding the part material to print a layer of 3D part 30. This servo process may be repeated for each printed layer until 3D part 30 and support structure 32 are completed.

While liquefier assembly 46 is in its active state for printing support structure 32 from a support material filament, drive mechanism 42, liquefier assembly 46, and nozzle 50 (each shown in FIG. 2) may operate in the same manner as drive mechanism 40, liquefier assembly 44, and nozzle 48 for extruding the support material. In particular, drive mechanism 40 may draw successive segments of the support material filament from consumable assembly 24 (via guide tube 28), and feed the support material filament to liquefier assembly 46. Liquefier assembly 46 thermally melts the successive segments of the received support material filament such that it becomes a molten support material.

The molten support material may then be extruded and deposited from nozzle 50 as a series of roads onto platen 14 for printing support structure 32 in a layer-by-layer manner in coordination with the printing of 3D part 30. After the print operation is complete, the resulting 3D part 30 and support structure 32 may be removed from chamber 12, and support structure 32 may be removed from 3D part 30. While the consumable filament of the present disclosure having the reversible reinforcement is described as being a part material, such as for printing 3D part 30, the consumable filament may also optionally be used as a support material, such as for printing support structure 32.

Figure 4A:
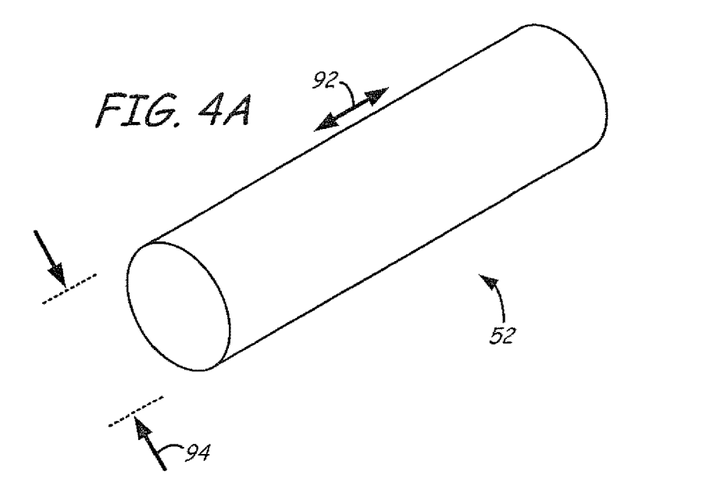
FIG. 4A is a perspective view of a segment of a cylindrical filament of the part material.
Figure 4B:
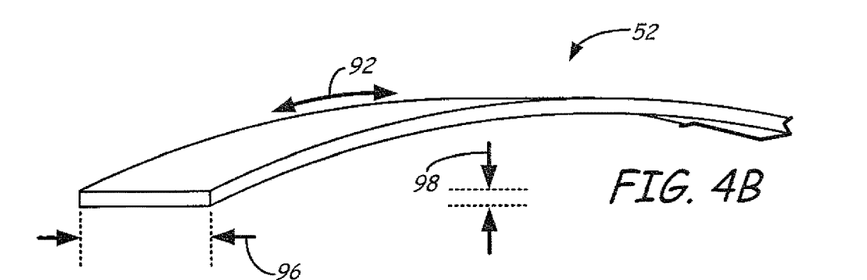
FIG. 4B is a perspective view of a segment of a ribbon filament of the part material.
Figure 4C:
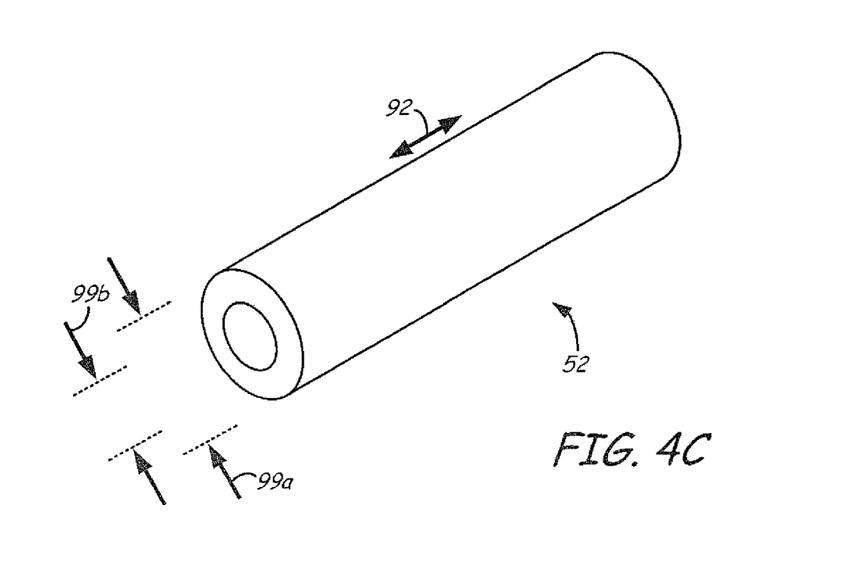
FIG. 4C is a perspective view of a segment of a hollow filament of the part material.

FIGS. 4A-4C illustrate example embodiments for filament 52. As shown in FIG. 4A, filament 52 (and the support material filament) may have a cylindrical or substantially cylindrical geometry, such as those disclosed in Crump, U.S. Pat. No. 5,121,329; Crump et al., U.S. Pat. No. 5,503,785; and Comb et al., U.S. Pat. No. 7,122,246. As shown in FIG. 4A, filament 52 may have a longitudinal length 92 and an average diameter (referred to as diameter 94) along longitudinal length 92.

As used herein, the term "average diameter" of a filament (e.g., diameter 94) is an average based on a 100-foot segment length of the filament. Diameter 94 may be any suitable dimension that allows filament 52 to be received by a print head of an additive manufacturing system (e.g., print head 18). Suitable dimensions for diameter 94 range from about 1.0 millimeter (about 0.04 inches) to about 3.0 millimeters (about 0.12 inches). In some embodiments, diameter 94 preferably ranges from about 1.0 millimeter (about 0.04 inches) to about 1.5 millimeters (about 0.06 inches). In other embodiments, diameter 94 preferably ranges from about 1.5 millimeters (about 0.06 inches) to about 2.0 millimeters (about 0.08 inches). The above-discussed ranges for diameter 94 may alternatively be referred to based on the average cross-sectional area of filament 52.

Alternatively, as shown in FIG. 4B, filament 52 (and the support material filament) may have a non-cylindrical geometry, such as a ribbon filament as disclosed in Batchelder et al., U.S. Pat. No. 8,221,669. In these embodiments, suitable liquefier assemblies for liquefier assemblies 44 and 46 (shown in FIG. 2) include those disclosed in Batchelder et al., U.S. Application Publication No. 2011/0074065; and in Swanson et al., U.S. Application Publication No. 2012/0070523.

The term "ribbon filament" as used herein refers to a filament (e.g., filament 52) having a substantially rectangular, arcuate, and/or an elliptical cross-section along its longitudinal length, which may include one or more surface tracks for engaging with drive mechanism 40, such as disclosed in Batchelder et al., U.S. Pat. No. 8,236,227. Correspondingly, the term "ribbon liquefier" as used herein refers to a hollow liquefier (e.g., liquefier tube 56) having a substantially rectangular, arcuate, and/or an elliptical hollow, inner-channel cross-section along its longitudinal length.

For each of the ribbon filament and the ribbon liquefier, the cross-section has a width and a thickness, where a maximum extent of the width is at least about 2.5 times greater than a maximum extent of the thickness. For a ribbon filament or ribbon liquefier having a substantially rectangular or arcuate cross-section, the cross-section may have sharp corners (i.e., 90-degree corners) and/or rounded corners. In aspects in which the ribbon filament has an elliptical cross-section, the elliptical cross-section preferably has an eccentricity of about 0.8 or greater, and more preferably of about 0.9 or greater. Examples of suitable ribbon filaments and ribbon liquefier architectures for filament 52 and liquefier assembly 44 include those discussed in Batchelder et al., U.S. Pat. Nos. 8,221,669; 8,236,227; and 8,439,665.

As shown in FIG. 4B, filament 52 may have a longitudinal length 92, an average width (referred to as width 96), and an average thickness (referred to as thickness 98). As used herein, the terms "average width" and "average thickness" of a filament (e.g., width 96 and thickness 98) are each an average based on a 100-foot segment length of the filament, and based on the maximum extent as discussed above. Width 96 and thickness 98 may be any suitable dimensions that allows ribbon filament 52 to be received by a print head of an additive manufacturing system (e.g., print head 18). Suitable dimensions for width 96 range from about 1.0 millimeter (about 0.04 inches) to about 10.2 millimeters (about 0.40 inches), and more preferably from about 2.5 millimeters (about 0.10 inches) to about 7.6 millimeters (about 0.30 inches). Suitable dimensions for thickness 98 may range from about 0.38 millimeters (about 0.015 inches) to about 1.3 millimeters (about 0.05 inches), and more preferably from about 0.51 millimeters (about 0.02 inches) to about 1.0 millimeter (about 0.04 inches).

The above-discussed ranges for width 96 and thickness 98 may alternatively be referred to based on the average cross-sectional area of filament 52. Furthermore, the cross-sectional dimensions of filament 52 for the ribbon-filament embodiment shown in FIG. 4B may also be referred to based on the cross-sectional aspect ratio of width 96 to thickness 98. For example, the cross-sectional aspect ratio (width 96-to-thickness 98) may range from about 2:1 to about 20:1. In some embodiments, the cross-sectional aspect ratio ranges from about 2.5:1 to about 10:1, and in further embodiments from about 3:1 to about 10:1.

Furthermore, as shown in FIG. 4C, filament 52 (and the support material filament) may alternatively have a hollow geometry. In this embodiment, filament 52 may have a longitudinal length 92, an average outer diameter (referred to as outer diameter 99a) along longitudinal length 92, and an average inner diameter (referred to as inner diameter 99b) along longitudinal length 92. As used herein, the terms "average outer diameter" and "average inner diameter" of a filament (e.g., outer diameter 99a and inner diameter 99b) are each an average based on a 100-foot segment length of the filament.

Outer diameter 99a and inner diameter 99b may be any suitable dimensions that allows hollow filament 52 to be received by a print head of an additive manufacturing system (e.g., print head 18). Suitable dimensions for outer diameter 99a include those discussed above for diameter 94. Inner diameter 99b may range from about 0.003 inches to about 0.3 inches. In some embodiments, inner diameter 99b preferably ranges from about 0.005 inches to about 0.15 inches. In other embodiments, inner diameter 99b preferably ranges from about 0.01 inches to about 0.03 inches. The above-discussed ranges for outer diameter 99a and inner diameter 99b may each alternatively be referred to based on the average cross-sectional area of filament 52.

In some preferred embodiments, inner diameter 99b is greater than an inner diameter of nozzle 48 (or nozzle 50) of print head 18. This allows the backflow of melt 70 in liquefier tube 56 to pass through the inner annulus of filament 52, rather than flow around the exterior side of filament 52. In particular, the hydraulic resistance of the inner annulus of filament 52 is low compared to the cylindrical sheath between the wall of liquefier tube 56 and the outer surface of filament 52.

Additionally, filament 52 having the hollow geometry as shown in FIG. 4C preferably has a compliance with respect to wheels 54 of drive mechanism 40 that ranges from about two times to about ten times greater than a corresponding compliance of the solid filament 52, as shown in FIG. 4A. In other words, if the hollow filament 52 is too soft, wheels 54 may not be capable of driving filament 52 into liquefier assembly 44. However, a mild amount of compliance can be beneficial to reduce any adverse effects caused by variations in outer diameter 99a. Moreover, diameter oscillations that can be inherent when manufacturing filaments can be accommodated by variations in inner diameter 99b, preferably making it easier to manufacture hollow filament 52 with a near-constant outer diameter 99a compared to a solid filament 52 (e.g., as shown in FIG. 4A).

Furthermore, as also discussed in Batchelder et al., U.S. Pat. No. 8,221,669, hollow filament 52 may allow system 10 to operate with faster liquefier response times and/or feed rates, and liquefier assembly 44 may optionally include a mating core to hollow filament 52, so that the extrudate is heated from the inside as well as the outside.

Yet another advantage of a hollow filament 52 is the reduced thermal conduction at inlet end 64 of liquefier tube 56. When a solid filament is stationary, heat may slowly conduct up the center of the filament to the zone above the heated portion of the liquefier where the walls are relatively cool. If the filament melts there, it tends to solidify against the cooler wall, potentially causing a large axial force to restart filament motion. The rate of heat conduction up a hollow filament, however, will be slower than the rate of conduction up a solid filament due to the lack of a core.

Consumable assembly 22 may include any suitable length of filament 52 as illustrated in FIGS. 4A-4C. Thus, longitudinal length 92 for filament 52 in the embodiments shown in FIGS. 4A-4C is preferably about 100 feet or more. In additional embodiments, filament 52 (e.g., as shown in FIGS. 4A-4C) (and the support material filament) may include topographical surfaces patterns (e.g., tracks) as disclosed in Batchelder et al., U.S. Pat. No. 8,236,227; and/or may include encoded markings as disclosed in Batchelder et al., U.S. Application Publication No. 2011/0233804.

Figure 5A:
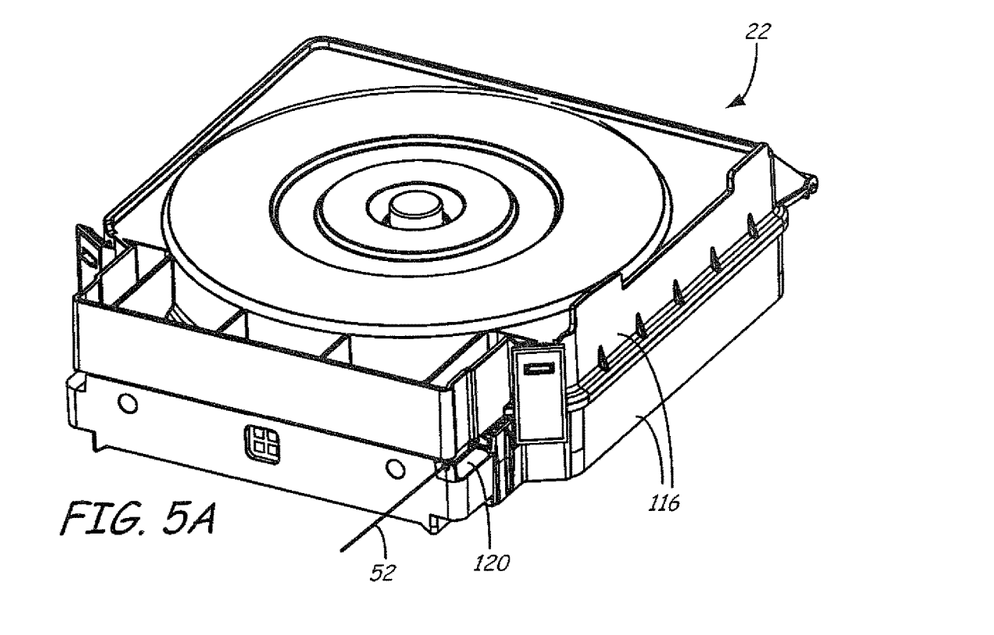
FIG. 5A is a perspective view of a first embodied consumable assembly for retaining a supply of the part material in filament form.

FIGS. 5A-9 illustrate examples of suitable consumable assemblies for consumable assembly 22 (and optionally, consumable assembly 24). For example, FIGS. 5A and 5B illustrates consumable assembly 22 with a container portion 116, spool 118, and guide mechanism 120, where container portion 116 is configured to open and close in a sealing manner as shown to retain spool 118 and guide mechanism 120. Spool 118 accordingly retains a supply of filament 52 of the part material, and relays filament 52 out of consumable assembly 22 via guide mechanism 120.

Figure 5B:
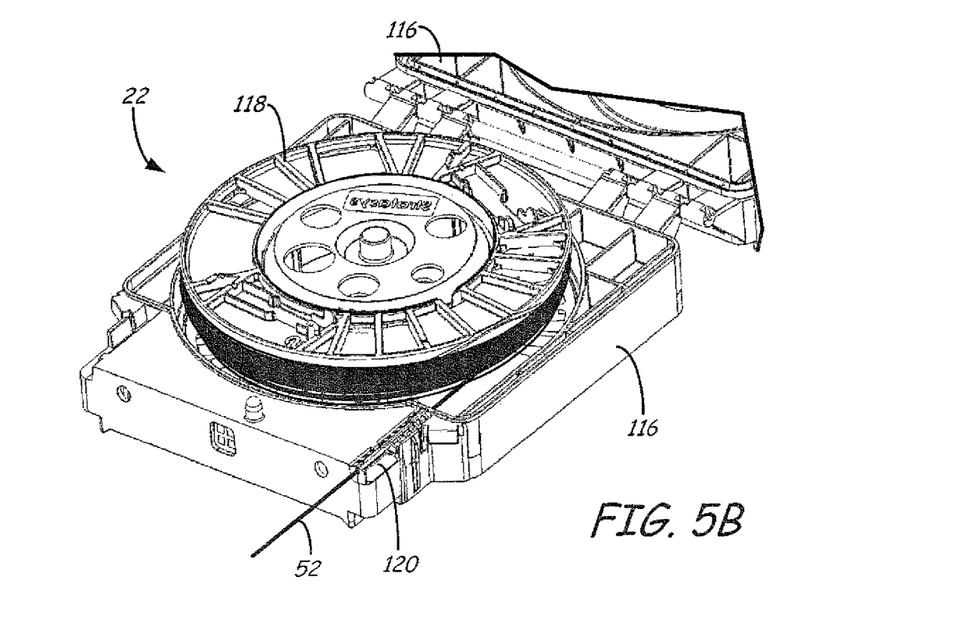
FIG. 5B is a perspective view of the first embodied consumable assembly in an open state, illustrating an interior of the first embodied consumable assembly.

During use, container portion 116 may be loaded to or otherwise engaged with system 10, which aligns guide mechanism 120 with a reciprocating orifice of system 10 (not shown) to deliver filament 52 to guide tube 26. Examples of preferred devices for consumable assembly 22 in this embodiment include those disclosed in Taatjes et al, U.S. Pat. Nos. 7,938,351 and 7,938,356. Alternatively, consumable assembly 22 may have spool and cassette arrangements as disclosed in Swanson et al., U.S. Pat. No. 6,923,634 and Comb et al., U.S. Pat. No. 7,122,246.

Figures 6A, 6B:
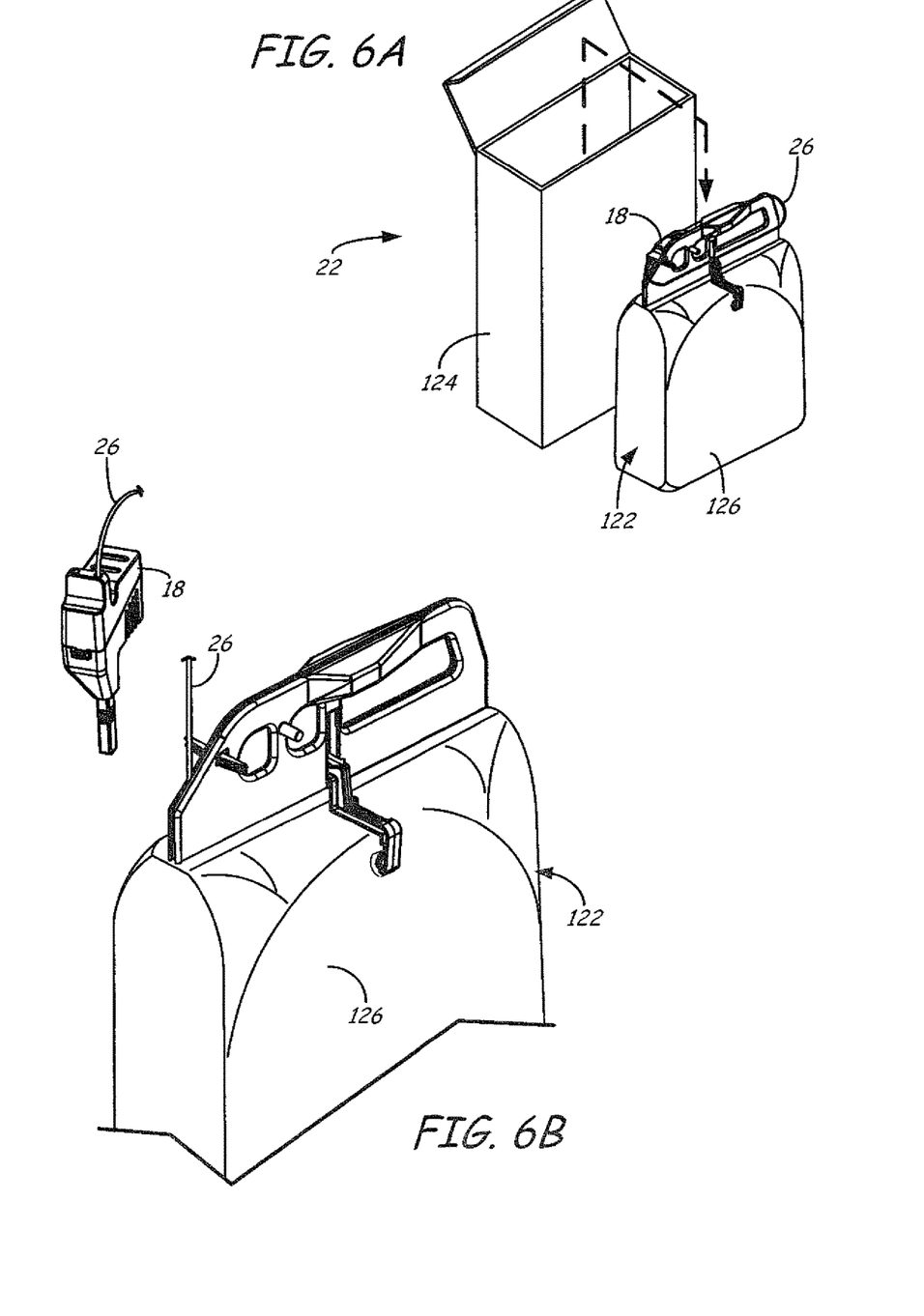
FIG. 6A is a perspective view of a second embodied consumable assembly for retaining a supply of the part material in filament form.
FIG. 6B is an expanded perspective view of the second embodied consumable assembly, illustrating an integrated print head and guide tube.
Figure 6C:
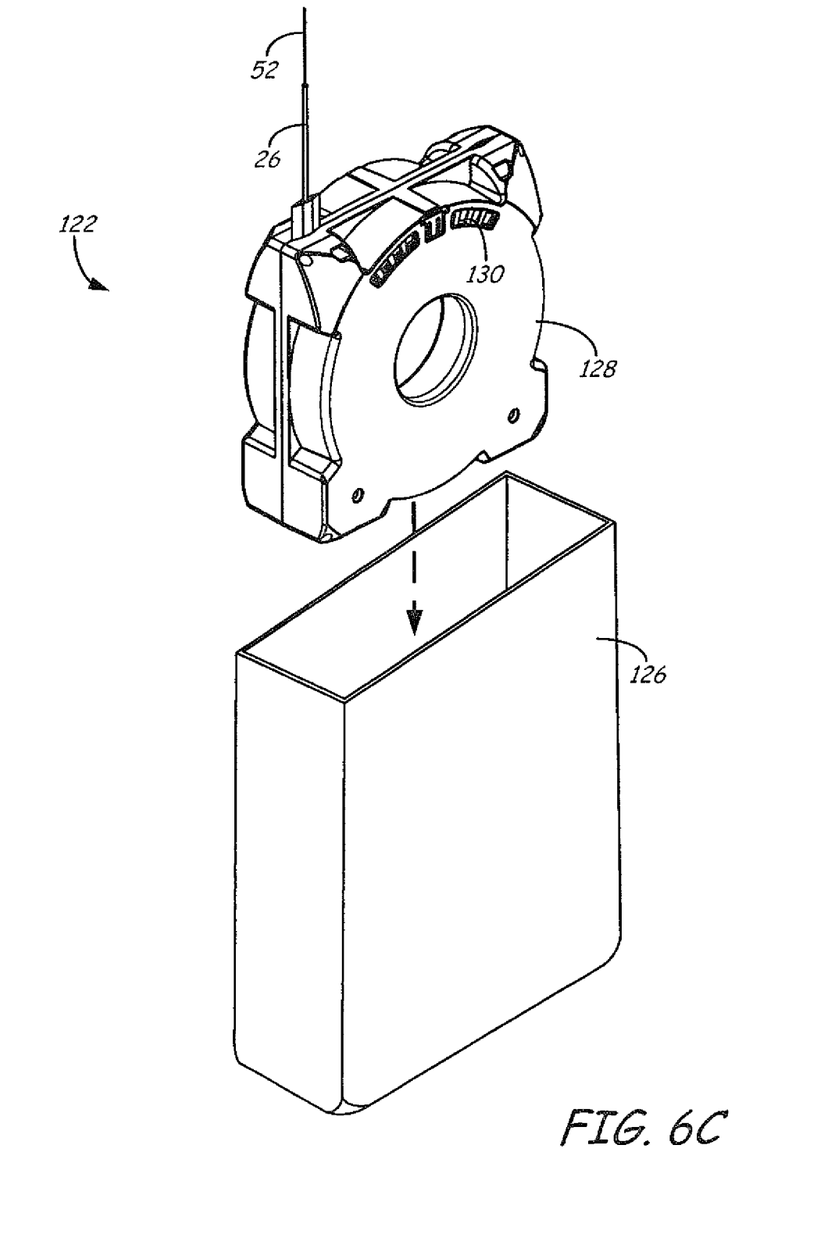
FIG. 6C is a perspective view of a container portion of the second embodied consumable assembly.

FIGS. 6A-6C illustrate an alternative embodiment for print head 18, consumable assembly 22, and guide tube 26, which are combined into a single, removable assembly. As shown in FIG. 6A, in this embodiment, consumable assembly 22 preferably includes container portion 122, which may be retained in a storage box 124, and is configured to mount print head 18 and guide tube 26.

As shown in FIG. 6B, print head 18 and guide tube 26 may be unmounted from container portion 122 and loaded to system 10 such that print head 18 is moveably retained by head gantry 20. As shown in FIG. 8C, container portion 122 may include liner 126, rigid module 128, and spool 130, where spool 130 is rotatably mounted within rigid module 128 and retains a supply of filament 52 of the part material. Rigid module 128 may also be secured within liner 126, which is preferably a moisture and/or gas-barrier liner.

Figure 7:
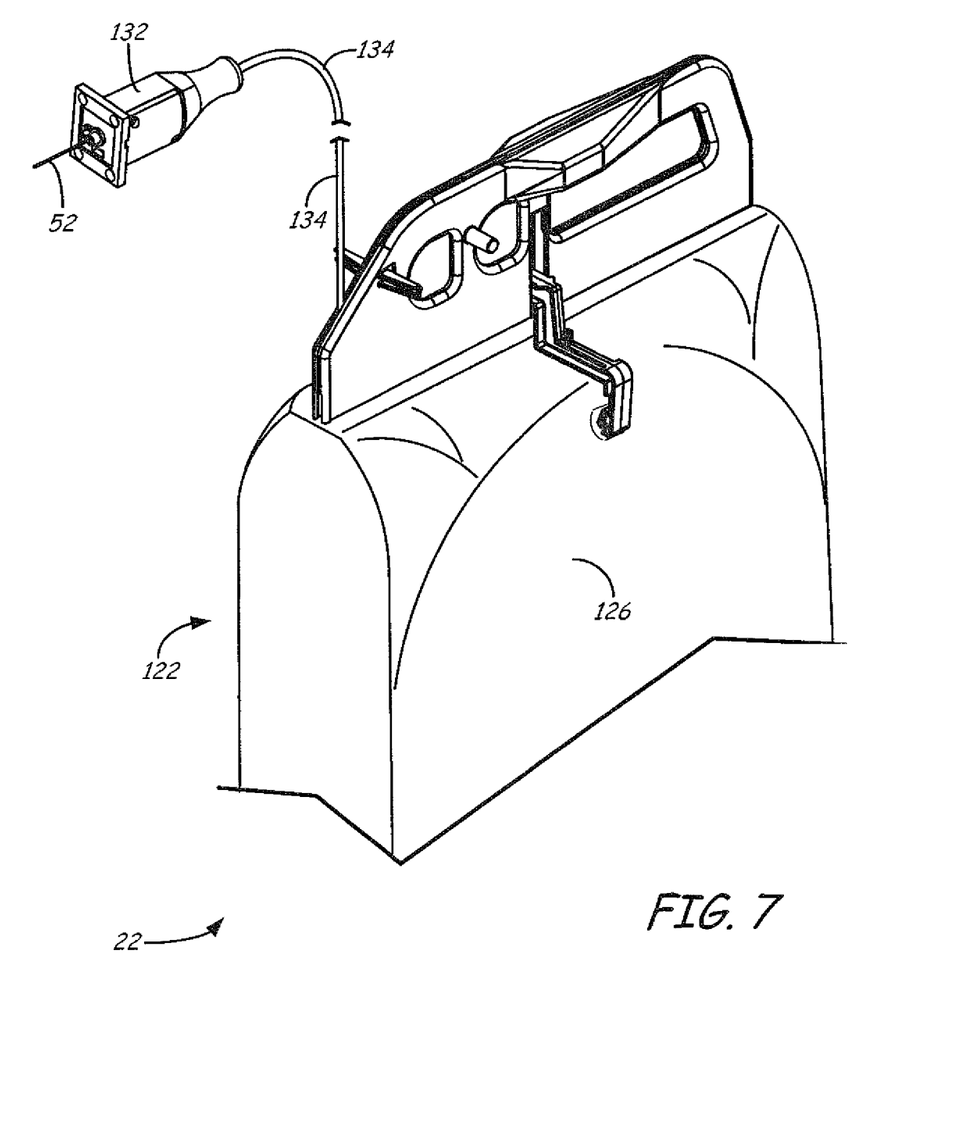
FIG. 7 is a perspective view of a portion of a third embodied consumable assembly, illustrating an integrated coupling adapter and guide tube.

FIG. 7 illustrates another alternative embodiment for consumable assembly 22, which is similar to the embodiment shown in FIGS. 5A-5C, but includes coupling adapter 132 and external guide tube 134, which are configured to engage an external port of system 10 (not shown) for feeding filament 52 to guide tube 26 and print head 18.

Figure 8:
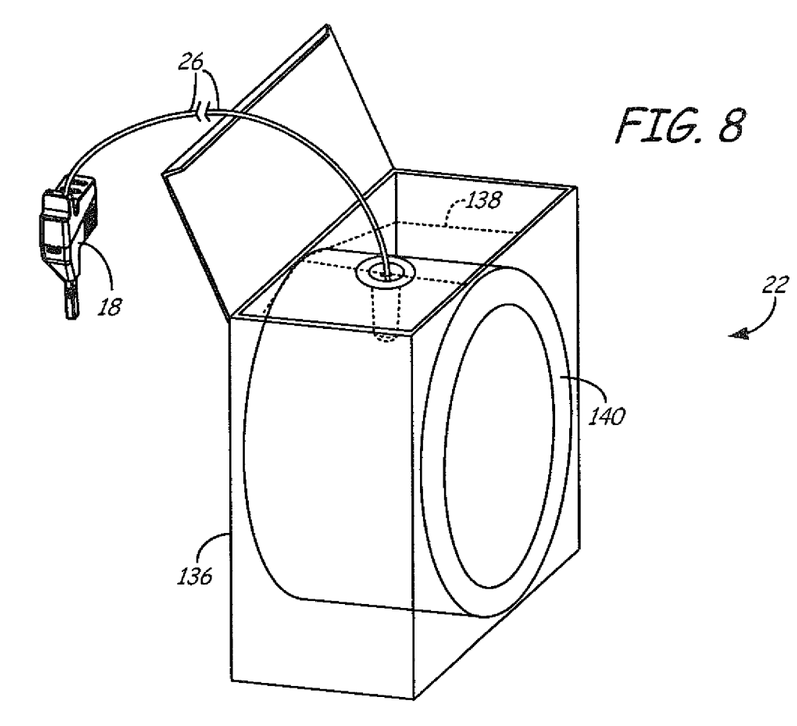
FIG. 8 is a perspective view of a fourth embodied consumable assembly for retaining a supply of the part material in filament form as a coil, and including an integrated print head and guide tube.

FIG. 8 illustrates yet another alternative embodiment for consumable assembly 22, which is also similar to the embodiment shown in FIGS. 6A-6C, but includes print heat 18, guide tube 26, container portion 136, liner 138, and spool-less coil 140 of filament 52. In this embodiment, guide tube 26 may extend within liner 138 and/or coil 140 to guide successive segments of filament 52 from coil 140 to print head 18. Liner 138 is preferably a moisture and/or gas-barrier liner configured to encase coil 140.

Figure 9:
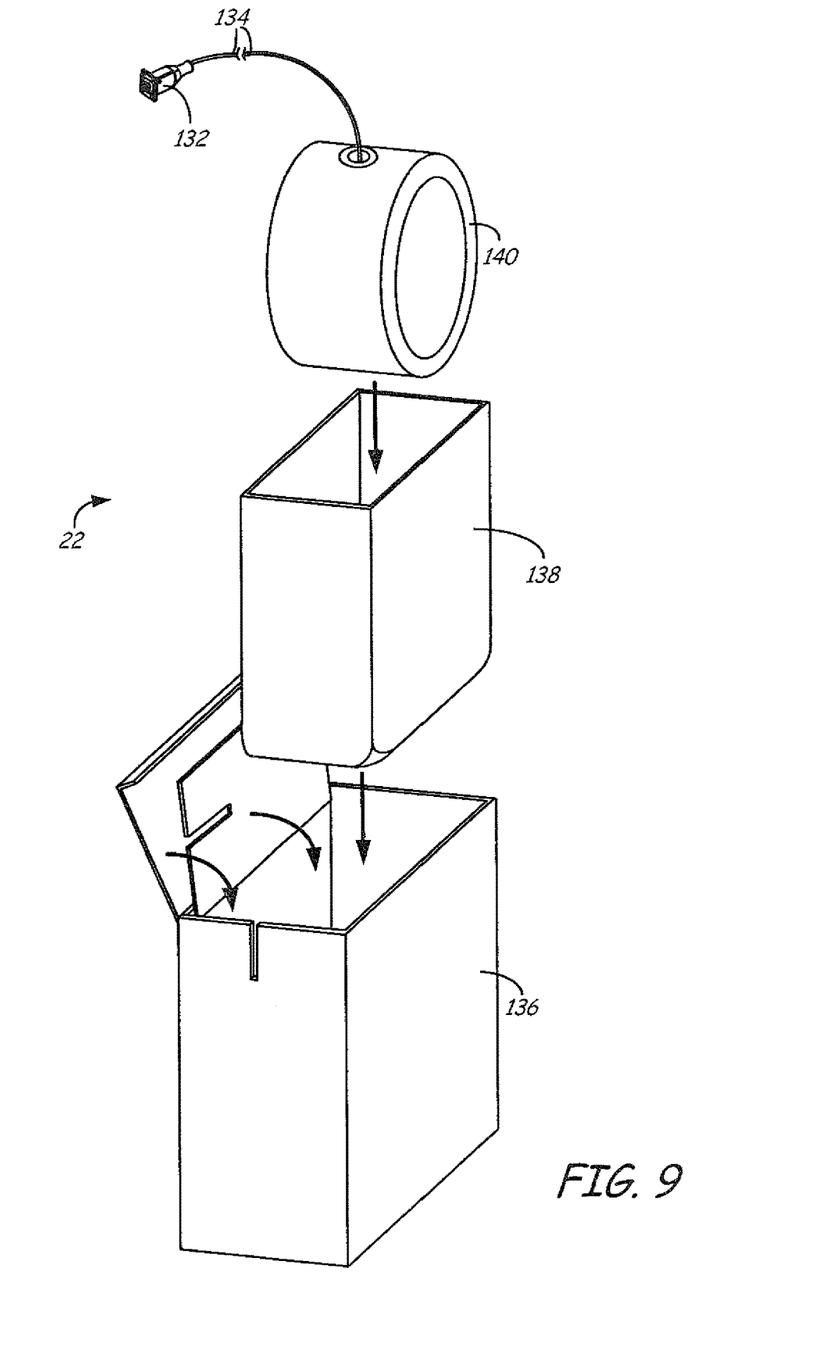
FIG. 9 is a perspective view of a portion of a fifth embodied consumable assembly, illustrating an integrated coupling adapter and guide tube, and a supply the part material in filament form as a coil.

FIG. 9 illustrates another alternative embodiment for consumable assembly 22, which is a combination of the embodiments shown in FIGS. 7 and 8, and includes coupling adapter 132, external guide tube 134, container portion 136, liner 138, and coil 140 of filament 52.

In each of the above-discussed embodiments for consumable assembly 22 (e.g., as shown in FIGS. 5A-9), the retained supply of filament 52 is preferably maintained in a dry state. As such, consumable assembly 22 may be pre-dried and sealed to prevent moisture absorption. Additionally, consumable assembly 22 may include one or more desiccant packs to maintain a dry environment during transportation, storage, and use. In alternative embodiments, the part material may be unsealed and exposed to atmospheric conditions during storage, transportation, and use with system 10.

Example 1

Several part materials were produced with polypropylene (PP), polylactic acid (PLA), or polyamide 6 (PA6) fibers as the reinforcing additive. An ethylene-octene copolymer from Dow Chemical under the tradename "ENGAGE 8402" was used as the elastomeric polymer. Chopped fibers of PP, PLA, and PA6 about 6 millimeters in length were obtained from MiniFIBERS Incorporated.

Elastomer compounds were produced with 15% fiber by weight using melt blending on a 26 mm Labtech co-rotating twin screw extruder at a temperature of 110° C. The extrudate was cooled by air on a belt and pelletized. The pellets were processed in a second melt processing operation to produce filament. A 0.75-inch single screw extruder from a Brabender Plasticorder was used to melt process the elastomer compounds through a capillary die with a diameter of 2.5 millimeters.

Each material was processed under two temperature conditions of 120° C. and 220° C. The examples at 120° C. are included to demonstrate the increase in flexural modulus over the control prior to thermal modification at the elevated 220° C. The extrudate was cooled and collected as filament. The flexural modulus of the filament was measured using dynamic mechanical analysis (DMA) using a three point bending configuration.

Table 1 lists the results for the flexural modulus of the various filaments. As seen by the data, at an extrusion temperature of 120° C. the flexural modulus values for all compounds are significantly greater than the elastomer. As processed at 220° C., the modulus is substantially reduced from that of the compound when extruded at 120° C.

TABLE 1

Flexural modulus results from extrusion of elastomer compounds

| Additives to Engage ™ 8402 Elastomer | Extrusion Temperature (° C.) | Flex Modulus (Mpa) |
| --- | --- | --- |
| 15% polypropylene fiber | 120 | 525 |
| 15% polypropylene fiber | 220 | 109 |
| 15% polylactic acid fiber | 120 | 310 |
| 15% polylactic acid fiber | 220 | 125 |
| 15% Polyamide 6 fiber | 120 | 380 |
| 15% Polyamide 6 fiber | 220 | 193 |
| Elastomer (Control) | 120 | 34 |

Example 2

Part materials were produced using an ethylene-octene copolymer from Dow Chemical under the tradename "ENGAGE 8402" with mineral whiskers of magnesium oxysulfate (Hyperform® HPR 803i from Miliken Chemical), and thermoplastic polyvinyl alcohol resin (Poval CP1210T30 from Kuraray America). The composition was composed of 50% elastomer polymer, 35% mineral whiskers, and 15% polyvinyl alcohol resin.

The three components were blended by melt processing using a 26-millimeter LabTech co-rotating, twin-screw extruder at a temperature of 180° C. The extrudate was cooled by air on a belt and pelletized. The pellets were processed in a second melt processing operation to produce filament. A 0.75-inch single screw extruder from a Brabender Plasticorder was used to melt process the elastomer compounds through a capillary die with a diameter of 2.5 millimeters to produce filament. The compound was similarly extruded through a profile die of 13-millimeter width and 4-millimeter thick. The flexural modulus of material after profile extrusion was measured as 3600 MPa using dynamic mechanical analysis (DMA) in a three point bending configuration.

Filament was fed into an extrusion-based additive manufacturing system under the tradename "MAKERBOT REPLICATOR 2×" from MakerBot Industries, Brooklyn, N.Y., and printed into conventional test articles. The article was subsequently immersed in water at 80° C. for 1 hour, rinsed and dried. The flexural modulus of the article after immersion in water was measured by DMA as 860 MPa. As such, by the chemical process, the modulus of the reinforced elastomer was reduced.

Although the present disclosure has been described with reference to preferred embodiments, workers skilled in the art will recognize that changes may be made in form and detail without departing from the spirit and scope of the disclosure. The disclosure of U.S. Provisional Patent Application No. 61/888,185 is incorporated by reference.

The invention claimed is:

1. A method of building a three-dimensional part with an additive manufacturing system, the method comprising:
    providing a supply of feedstock material to a liquefier of the additive manufacturing system wherein the feedstock material comprises at least 50% by weight an elastomer and up to 50% by weight a reinforcing additive wherein the feedstock material has a flexural modulus greater than about 300 megaPascals (MPa);
    heating the feedstock material in the liquefier and extruding the molten feedstock material through a nozzle provided in an outlet of the liquefier;
    depositing the molten feedstock material in a layer by layer manner to build the three-dimensional part; and
    chemically treating the three-dimensional part to dissolve or weaken at least a portion of the reinforcing additive such that the flexural modulus of the three-dimensional part is less than the flexural modulus of the feedstock material.

2. The method of claim 1, wherein chemically treating the three-dimensional part comprises using a water-based solution to dissolve or weaken the reinforcing additive to decrease the flexural modulus of the three-dimensional part.

3. The method of claim 1, wherein chemically treating the three-dimensional part comprises using an acidic solution to dissolve or weaken the reinforcing additive decrease the flexural modulus of the three-dimensional part.

4. The method of claim 1, wherein the elastomer is an elastomeric thermoplastic material derived from polyolefins, polyesters, styrenics, polyurethanes, or combinations thereof.

5. The method of claim 1, wherein the reinforcing additive comprises mineral whiskers, mineral salts, or combinations thereof and wherein the feedstock material of has a flexural modulus greater than about 1500 MPa.

6. The method of claim 5, wherein after chemically treating the three-dimensional part to dissolve or weaken the reinforcing additive the three-dimensional part has a flexural modulus less than about 1500 MPa.

7. A method of building a three-dimensional part with an additive manufacturing system, the method comprising:
    providing a supply of feedstock material to a liquefier of the additive manufacturing system wherein the feedstock material comprises at least 50% by weight an elastomer and up to 50% by weight a reinforcing additive wherein the feedstock material has a flexural modulus greater than about 300 megaPascals (MPa);
    heating the feedstock material in the liquefier to a temperature that thermally degrades or softens at least a portion of the reinforcing additive;
    extruding the molten feedstock material through a nozzle provided in an outlet of the liquefier; and
    depositing the molten feedstock material in a layer by layer manner to build the three-dimensional part, wherein the flexural modulus of the three-dimensional part is less than the flexural modulus of the feed stock material.

8. The method of claim 7, wherein the reinforcing additive is a polymer fiber comprising polypropylene, polylactic acid, polyamide-6 fibers or combinations thereof.

9. The method of claim 7, wherein the elastomer is an elastomeric thermoplastic material derived from polyolefins, polyesters, styrenics, polyurethanes, or combinations thereof.

* * * * *